United States Patent [19]

Shimoda

[11] 4,107,751
[45] Aug. 15, 1978

[54] MAGNETIC HEAD
[75] Inventor: Misao Shimoda, Hamura, Japan
[73] Assignee: Olympus Optical Co., Ltd., Tokyo, Japan
[21] Appl. No.: 685,060
[22] Filed: May 10, 1976
[30] Foreign Application Priority Data
May 26, 1975 [JP] Japan .................................. 50/62616
[51] Int. Cl.² ............................................. G11B 5/12
[52] U.S. Cl. ..................................... 360/122; 360/121
[58] Field of Search ....................... 360/122, 118–125; 29/603

[56] References Cited
U.S. PATENT DOCUMENTS

| 2,711,945 | 6/1955 | Kornei | 360/122 |
|---|---|---|---|
| 2,736,775 | 2/1956 | Camras | 360/118 |
| 2,736,776 | 2/1956 | Camras | 360/118 |
| 3,105,965 | 10/1963 | Joannou | 360/118 X |
| 3,449,529 | 6/1969 | Camras | 360/118 |
| 3,663,767 | 5/1972 | Shimotori et al. | 360/122 |
| 3,668,775 | 6/1972 | Morita et al. | 360/122 X |
| 3,765,083 | 10/1973 | Seehawer | 360/119 X |
| 3,928,908 | 12/1975 | Case | 360/122 X |

FOREIGN PATENT DOCUMENTS 1,167,053   4/1964   Fed. Rep. of Germany ........... 360/118

Primary Examiner—John H. Wolff
Attorney, Agent, or Firm—Ostrolenk, Faber, Gerb & Soffen

[57] ABSTRACT

A magnetic head for use with a tape recorder or the like comprises a core having a gap and which has a non-magnetic material of a similar mechanical property as the core material bonded to the periphery or part thereof, thereby preventing a foul-up of the head surface with dusts and avoiding damage to the magnetic tape; the foul-up or the damage occurs when the periphery of the core is filled with a layer of synthetic resin adhesive.

1 Claim, 16 Drawing Figures

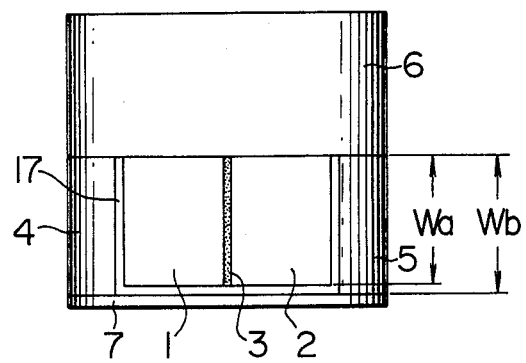
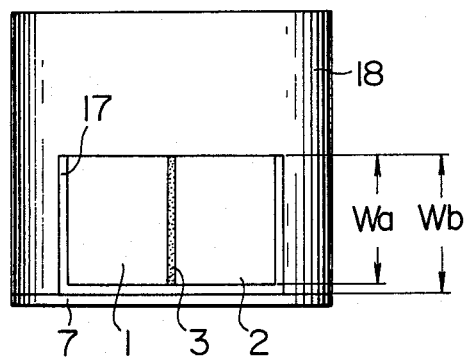
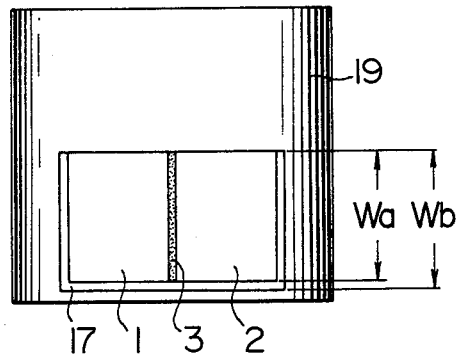
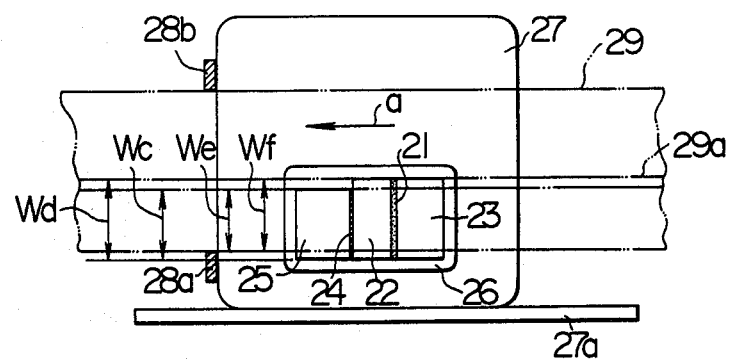

MAGNETIC HEAD

BACKGROUND OF THE INVENTION

The invention relates to a magnetic head for use with a tape recorder or the like.

A conventional monoaural magnetic head is shown in FIG. 1, in which a pair of symmetrical core pieces 1, 2 of a ferromagnetic material define a gap 3 by interposing a material such as ceramic therebetween. The assembly is enclosed by left- and right-hand non-magnetic blocks 4, 5 and by upper and lower non-magnetic blocks 6, 7, all of which are molded from a synthetic resin adhesive material. The rear portion is covered by a non-magnetic block 8, with a pair of terminal members 9, 10, which are connected with a coil disposed on the core pieces 1, 2, extending through the rear portion. An example of head which may be used for stereophonic applications is illustrated in FIG. 2 wherein it will be noted that an additional pair of core pieces 12, 13 which defines another gap 14 are juxtaposed with the first mentioned pair of core pieces 1, 2 with a shield plate 11 interposed between the respective pairs. Another pair of coil terminals 15, 16 is associated with the core pieces 12, 13.

When manufacturing such a conventional magnetic head, the monoaural head shown in FIG. 1 is usually formed by disposing the non-magnetic blocks 4 to 8 around the core pieces 1, 2 (see FIG. 3) and filling the spaces between the core pieces 1, 2 and the respective non-magnetic blocks 4 to 8 with a synthetic resin adhesive, which is molded into a layer 17. At this end, it is necessary to provide a track width W$a$ for the core pieces 1, 2 which is different from the width W$b$ of the non-magnetic blocks 4, 5 for the sake of the thickness of the layer 17. In other words, the different values of the widths W$a$, W$b$ resulted from the manufacturing requirements for providing the layer 17. The same applies to the manufacturing of a stereophonic magnetic head shown in FIG. 2. The same is also true where the non-magnetic blocks 4, 5 and 6 are formed integrally to provide a non-magnetic body 18 as shown in FIG. 4 or where all of the non-magnetic blocks 4 to 7 form one intergral unit to provide a non-magnetic body 19 as shown in FIG. 5.

In these conventional magnetic heads, since the layer 17 is much softer than the material of the core pieces, fine particles of the magnetic material which are produced by the frictional engagement between the core pieces and the tape tend to be trapped by the layer 17, thereby considerably degrading the performance of the magnetic head. The situation is similar in a composite head as shown in FIG. 6 in which an erase head and a record/playback head are integrally unified.

In a conventional composite head, the track width of an erase gap is greater than the track width of a record/playback gap. This is because of the fact that when recording a magnetic tape, it tends to oscillate crosswise during its running, though slightly, to cause a tortuous recording track which can only be completely erased by providing an increased width for the erase gap.

FIG. 6 shows an example of such a composite magnetic head. An erase gap 21 is defined between a central core piece 22 and a right-hand core piece 23 which is located at the same level as the core piece 22. A record/playback gap 24 is defined between the central core piece 22 and a left-hand core piece 25 which is reduced in elevation relative to the core piece 22. The record/playback gap 24 has a width W$c$ which is reduced as compared with the width W$d$ of the erase gap 21. For this reason, after finishing the respective core pieces 22, 23 and 25 so that their lower surfaces are flush with each other, the cores 22 and 25 are located so that their upper surfaces are offset by an amount equal to W$d$ − W$c$, and are then secured to the inside of a shield case 27 molding of a synthetic resin adhesive 26.

The shield case 27 is fixedly mounted on a support plate 27$a$, and carries on its left-hand sidewall a pair of upper and lower tape guides 28$a$, 28$b$ which are disposed so that a magnetic tape 29, shown in phantom lines, can be passed therebetween in sliding contact with the front surface of the composite magnetic head in a direction indicated by an arrow $a$, thereby permitting an erase, a record or a playback operation on a magnetic track portion of the tape which is indicated by a width W$e$, while maintaining such portion which is located below the centerline 29$a$ in abutment against both gaps 24 and 21.

When manufacturing such a composite magnetic head, it is necessary that the lower surfaces of the respective core pieces 22, 23 and 25 be finished so as to be flush with each other, and to determine, with a high accuracy, the difference W$d$ − W$c$ in the width of the both gaps 21, 24, and the distance W$f$ from the upper edge of the lower tape guide 28$a$ to the centerline 29$a$ of the magnetic tape 29 as well as the track width W$e$ or the distance from the upper edge of the guide 28$a$ to the upper edge of the magnetic track. When a ferromagnetic material of an oxide type such as ferrite or the like is used for the core of the composite magnetic head, it is desirable that a non-magnetic block which has a hardness and the other mechanical properties approaching those of the ferrite be arranged around the core. However, in practice, because of the presence of the step defined by the difference W$d$ − W$c$, this region and the remainder of the periphery had to be filled with a synthetic resin adhesive 26 which is poured therearound. This results in the formation of a depression in such region as a result of the differential hardness between the core pieces and the resin material and may disadvantageously cause an accumulation of dust therein or rubbing off the surface of the magnetic tape.

Where an alloy such as permalloy is used for the core material of the magnetic head, the entire peripheries of the respective core pieces have to be supported by core retaining blocks. However, the presence of the step W$d$ − W$c$ creates a non-uniform clearance between the core pieces and the core retaining blocks, rendering it difficult to achieve a high accuracy in locating the parts so as to produce the differential gauge W$d$ − W$c$ as well as the track width W$e$ or the above mentioned distance W$f$.

SUMMARY OF THE INVENTION

It is an object of the invention to provide a magnetic head which eliminates the above mentioned disadvantages of the prior art through the substantial elimination of a layer of synthetic resin adhesive. This achieved by initially adhesively applying non-magnetic blocks to the opposite sides of a core block which defines a gap having an increased width, the blocks being in conformity to and having the same width as the core block, and subsequently cutting the assembly into a core having a gap which corresponds to a required track width, thereby obtaining a complete coincidence in the width of the core and the non-magnetic blocks.

It is another object of the invention to provide a composite magnetic head having core pieces which define a step therebetween wherein the above disadvantages of the prior art are eliminated by the use of a positioning block of a non-magnetic material to fill the space created by the step without recourse to the use of a synthetic resin adhesive.

In accordance with the invention, the use of a layer of synthetic resin adhesive which is inferior in mechanical properties to the core, at a location adjacent to a portion of the magnetic head which is in abutment with a magnetic tape, is minimized, thereby avoiding the adhesion or accumulation of dust to such portion and also avoiding a consequent degradation in the performance of the head which may be caused by the dust.

A similar effect is achieved with a composite magnetic head, and additionally, damage which may be caused to a portion of the magnetic tape by an edge of the core in the region where the step $Wd - Wc$ exists, is also eliminated. Finally, the assembly of the magnetic head is facilitated.

BRIEF DESCRIPTION OF THE DRAWINGS

FIGS. 3 to 6 are front views of conventional magnetic heads;

DETAILED DESCRIPTION OF PREFERRED EMBODIMENTS

Figure 1:
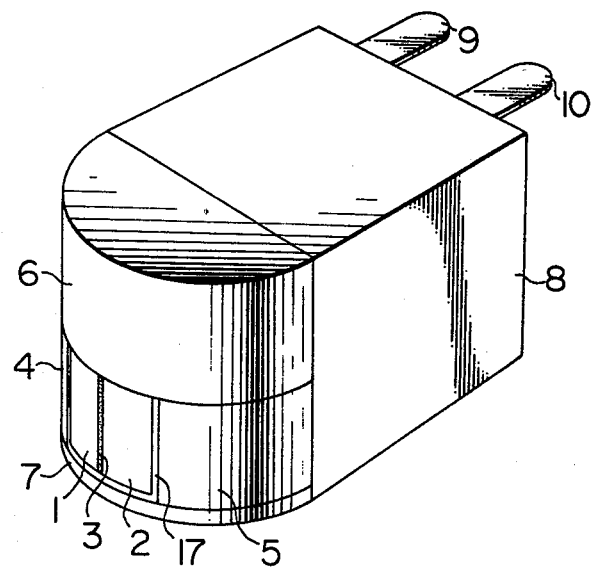
FIGS. 1 and 2 are perspective views of conventional monoaural and stereophonic magnetic heads.
Figure 2:
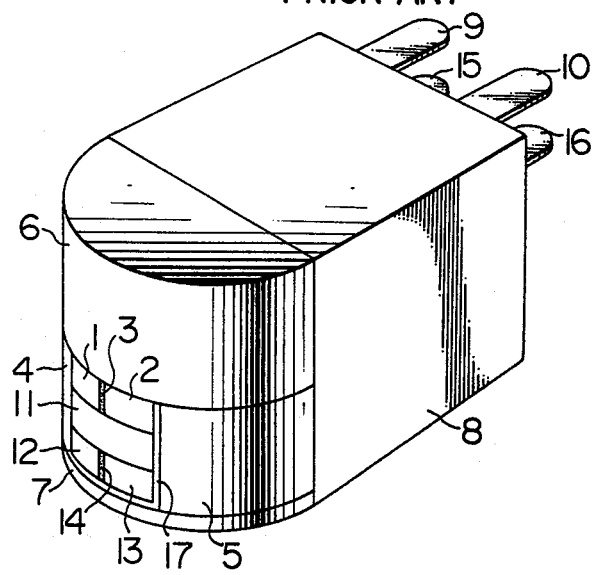
Figure 7:
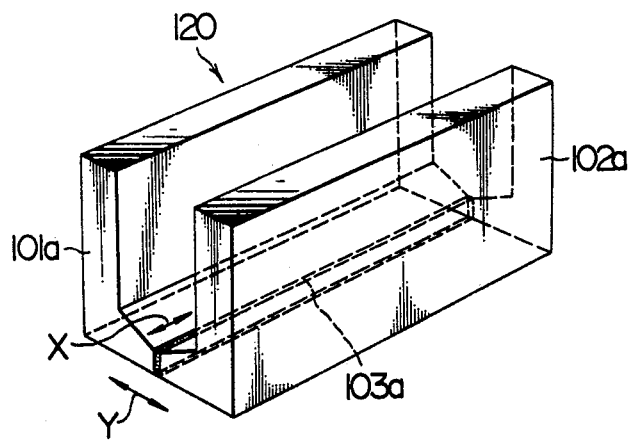
FIG. 7 is a perspective view of a core block before it is cut to form a magnetic head assembly according to the invention.
Figure 8:
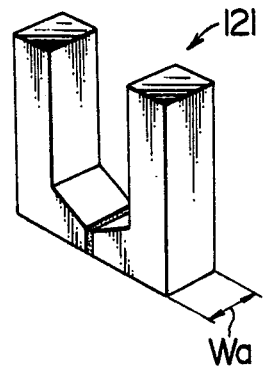
FIG. 8 is a perspective view of an exemplary core of the prior art.
Figure 9:
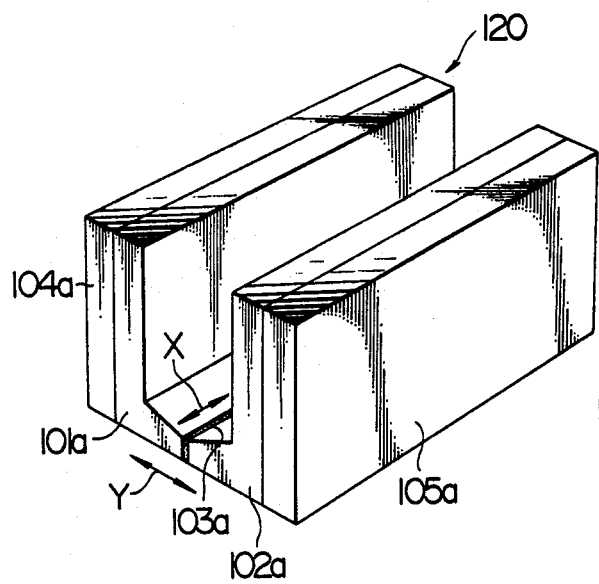
FIG. 9 is a perspective view of the core block used in the magnetic head of the invention after a non-magnetic body is adhesively applied to its lateral sides.
Figure 10:
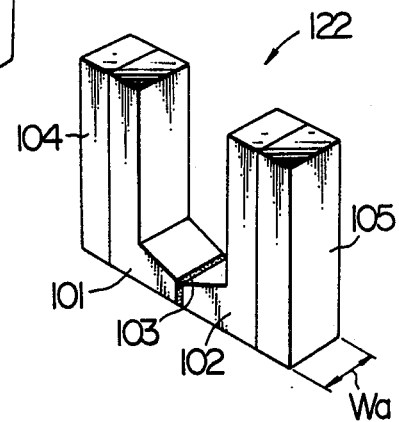
FIG. 10 is a perspective view of a core cut from the core block.
Figure 11:
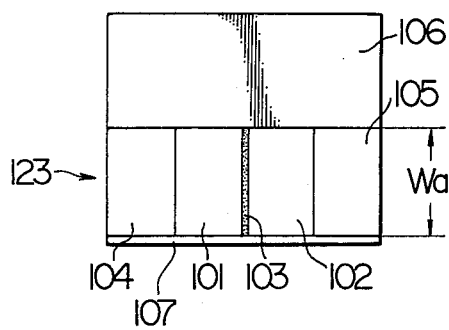
FIG. 11 is a front view of a monoaural magnetic head constructed in accordance with one embodiment of the invention.
Figure 12:
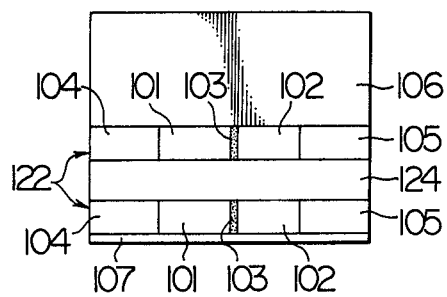
FIG. 12 is a front view of a stereophonic magnetic head constructed in accordance with another embodiment of the invention.

Referring to FIG. 7, there is provided a core block 120 which comprises a pair of core block pieces 101a and 102a which cooperatively defines a long gap 103a in the direction shown by arrow X having a substantial gap width in the direction shown by arrow Y therebetween. The conventional core, is cut to have a gap 103 of a required track width Wa, as shown at 121 in FIG. 8. However, in accordance with the invention, before a core of a desired size is cut, a pair of non-magnetic blocks 104a, 105a which conform to and are similar in width to the core block 120 are applied to the left- and right-hand sides thereof with an epoxy resin adhesive, for example. Subsequently, the core block 120 having the non-magnetic block pieces 104, 105 bonded therewith is cut to size, providing a core 122 having a desired track width Wa, as shown in FIG. 10. It will be noted that all of core pieces 101, 102 and the non-magnetic block pieces 104, 105 have the same gap which is equal to the width Wa of the gap 103. When upper and lower non-magnetic blocks 106, 107 are adhesively secured to the core 122 thus obtained, and a coil (not shown) is disposed as usual thereon, there is obtained a monoaural magnetic head 123 as shown in FIG. 11. While the head 123 is generally similar in configuration to the one shown in FIG. 1, it is to be noted that in the construction shown in FIG. 11, there is no counterpart of the synthetic resin adhesive layer 17 shown in FIG. 1. As a consequence, there occurs no adhesion or accumulation of dusts on the head surface of the magnetic head of the invention, nor is any degradation in performance caused.

When manufacturing a stereophonic magnetic head, two of the cores 122 (shown in FIG. 10) may be disposed or juxtaposed in vertical alignment with a shield plate 124 interposed therebetween, and the assembly adhesively secured together with the non-magnetic blocks 106 and 107 adhesively applied to the top and bottom of the assembly. Coils (not shown) are disposed on the core pieces.

Figure 13:
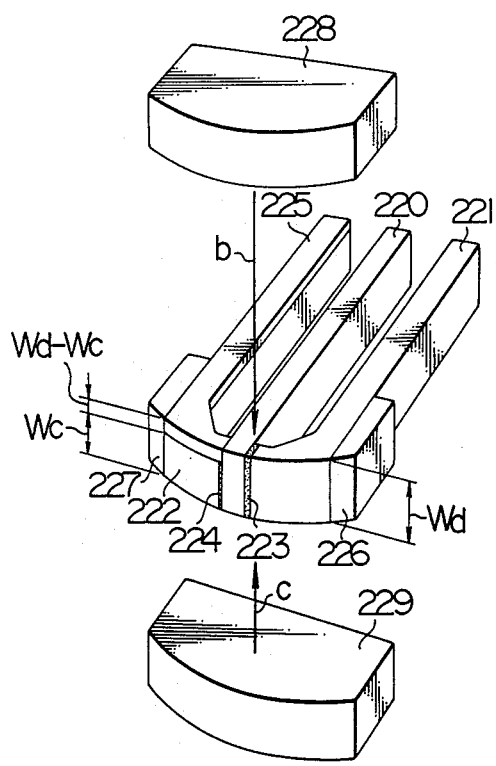
FIG. 13 is an exploded, perspective view of core, positioning block and core retaining blocks, all of which are used in the composite magnetic head of the invention.
Figure 14:
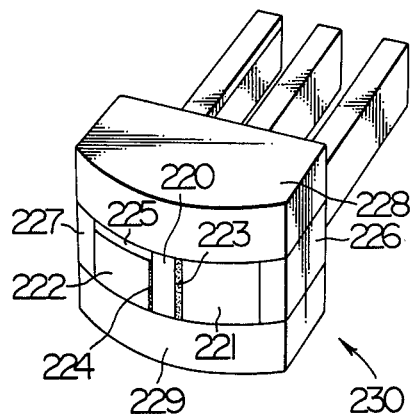
FIG. 14 is a perspective view of the composite magnetic head which is formed by assembling the parts shown in FIG. 13.

FIGS. 13 and 14 show the construction of a composite magnetic head which employs a ferromagnetic material of an oxide type, such as ferrite, for the core. In FIG. 13, both a central core piece 220 and a right-hand core piece 221 have a thickness which is equal to or greater than Wd (see FIG. 6), while a left-hand core piece 222 has a reduced thickness with its upper surface being located at a level of Wc (see FIG. 6). Associated with the left-hand core piece 222 is a non-magnetic positioning block 225 which has the similar plane contour as the core piece 222 and which has a thickness equal to or greater than $Wd - Wc$. Initially, the positioning block 225 is adhesively secured to the upper surface of the core piece 222, and the surfaces of the respective core pieces 220, 221 and 222 which define individual gaps are polished to a mirror finish. Subsequently, the individual core pieces are disposed in abutment with a gap defining material such as glass, ceramic or the like, for example, interposed therebetween, and then the assemblies are fused together at the gaps, thereby providing an erase gap 223 and a record/playback gap 224.

After the formation of the erase gap 223 and the record/playback gap 224, a pair of left- and right-hand core retaining blocks 226, 227 which have a height equal to or slightly greater than Wd are adhesively applied to the left- and right-hand lateral sides of the assembly which comprises the core pieces 220 to 222 and the positioning block 225. The upper and lower surfaces of the overall assembly are polished to the given thickness Wd. A pair of upper and lower core retaining blocks 228, 229 are adhesively applied to the upper and lower sides of the assembly so as to enclose it from the opposite sides, as indicated by arrows b and c, and coils are disposed on the respective core pieces to complete a composite magnetic head 230 shown in FIG. 14.

Figure 15:
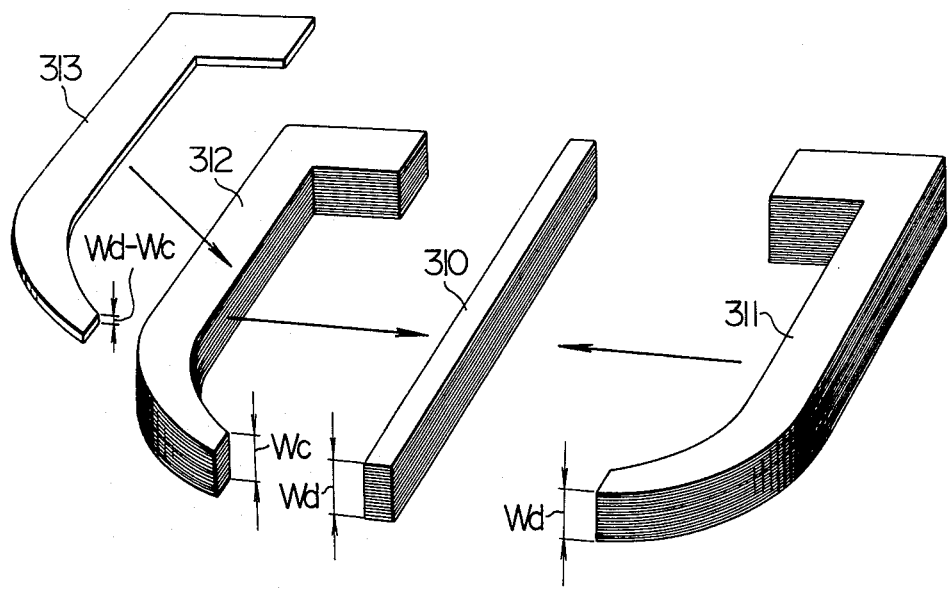
FIG. 15 is an exploded, perspective view of core pieces and positioning block which constitute together another composite magnetic head according to the invention.
Figure 16:
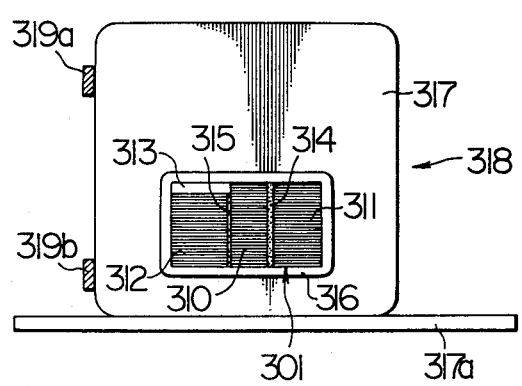
FIG. 16 is a front view of the composite magnetic head which is formed by assembling the parts shown in FIG. 15.

FIGS. 15 and 16 illustrate the use of a laminated core formed of an alloy such as permalloy in order to form a composite magnetic head. In FIG. 15, a central laminated core piece 310 and a right-hand laminated core piece 311 have an equal thickness $Wd$ while a left-hand laminated core piece 312 has a thickness $Wc$. Associated with the core piece 312 is a positioning block 313 of a non-magnetic material, the block 313 having a thickness which is equal to $Wd - Wc$ and which has a plane contour corresponding to that of the core piece 312. The positioning block 313 is adhesively secured to the upper surface of the laminated core piece 312, and subsequently the abutting portions of the respective laminated core pieces 310 to 312 are polished to a mirror finish. A gap defining material which may comprise Be-Cu alloy is interposed between the individual core pieces, and then they are adhesively secured together to form a core 301 in which an erase gap 314 and a record/playback gap 315 (see FIG. 16) are defined. It will be understood that the lower surfaces of the respective core pieces 310 to 312 lie on a common plane.

After disposing coils on the core 301, a molding resin (shown at 316) is poured around the core to secure it within a shield case 317, thus forming a composite magnetic head 318. The shield case 317 is fixedly mounted on a support plate 317a, and the case 317 is provided with a pair of tape guides 319a, 319b which are located on the left-hand sidewall thereof in vertical alignment. In this embodiment, at least the step region arising from the difference in the width, $Wd - Wc$, is occupied by the positioning block 313 to dispense with a layer of synthetic resin adhesive from this region, so that drawbacks mentioned above in connection with the step region are eliminated.

It is noted that the above mentioned blocks 104, 105; 106, 107; 225, 226, 227; 228, 229; and 313 are made of non-magnetic material such as glass, ceramic, phosphor bronze, a certain non-magnetic ferrite or the others which have mechanical properties similar to those of the core.

What is claimed is:

1. A composite magnetic transducer head for a magnetic tape; said transducer head comprising a central core piece, a second core piece disposed on one side of the central core piece and having the same elevation as the central core piece, and a third core piece disposed on the opposite side of the central core piece and having a reduced elevation as compared with the central core piece; each of the said core pieces having a plane upper surface and a parallel plane lower surface, a record/playback gap being defined between the central core piece, and the third core piece (and the third core piece,) and an erase gap being defined between the central core piece and the second core piece; the lower plane surface of the respective core pieces extending in the same plane with each other, and a positioning block having a thickness which is equal to the difference in elevation between the central core piece and the third core piece, the positioning block being disposed on the upper surface of the third core piece, said positioning block has a plane upper surface and a parallel plane lower surface engaging the upper surface of said third core piece; the upper surfaces of the first and second core pieces and of the positioning block extending in the same plane, all of the core pieces and the positioning block being integrally secured together; the interfitting surfaces of said members being polished to a mirror finish to present a smooth surface to said tape, said core pieces and block being enclosed by non-magnetic blocks so as to form a unitary composite transducer head.

* * * * *